United States Patent [19]

Lankston

[11] 4,401,133
[45] Aug. 30, 1983

[54] DEVICE FOR LAUNCHING SPHERICAL PIGS INTO A PIPELINE

[75] Inventor: Robert J. Lankston, Shawnee, Kans.

[73] Assignee: Gulf & Western Manufacturing Company, Southfield, Mich.

[21] Appl. No.: 268,058

[22] Filed: May 28, 1981

[51] Int. Cl.³ ............................................. B08B 9/04
[52] U.S. Cl. ........................... 137/268; 15/104.06 A
[58] Field of Search ................ 137/268; 15/104.06 A

[56] References Cited

U.S. PATENT DOCUMENTS

3,232,090  2/1966  Walker ............................. 137/268 X
3,404,421 10/1968  Surber ............................. 137/268 X
3,779,270 12/1973  Davis .................................. 137/268

*Primary Examiner*—Alan Cohan
*Attorney, Agent, or Firm*—Body, Vickers & Daniels

[57] ABSTRACT

An improvement in a device adapted to be connected to a pipeline for launching generally spherical pigs into the pipeline, which device includes an elongated barrel secured to the pipeline and having a forward end for passage of a pig from the barrel and an escapement means for allowing passage of the pig from the barrel into the pipeline. The improvement involves an elongated pig receptacle having an open end and adapted to be telescopically moved into the barrel to an inserted position with the opened end at the forward end of the barrel and the escapement means includes a first member carried by the receptacle, a second member fixed onto the barrel and interconnecting means for drivingly interconnecting the first and second members when the receptacle is in the inserted position within the barrel so that the member secured on the barrel can be moved in a manner to operate the member fixed and carried by the receptacle.

20 Claims, 12 Drawing Figures

DEVICE FOR LAUNCHING SPHERICAL PIGS INTO A PIPELINE

The present invention relates to the art of pipeline management and more particularly to a device for launching or retrieving spherical pigs used for various purposes in pipeline management and maintenance.

INCORPORATION BY REFERENCE

For the purposes of background, the following U.S. Pat. Nos. are incorporated by reference herein: Osborne 2,953,157; Eagleton 3,169,263; Walker 3,232,090; Elliott 3,266,077; and Davis 3,779,270.

BACKGROUND OF INVENTION

It has become common practice to pass generally, spherical structures, known in the art as pigs, through oil and gas pipelines to perform various functions, such as to establish the interface between separate substances being conveyed through the pipeline, to clean the pipeline, and to measure the flow or other properties in the pipeline. To launch the pigs into the pipeline, various structures have been employed. One of these is shown in Eagleton U.S. Pat. No. 3,169,263 wherein an inclined barrel having a supply of spherical pigs is connected to the pipeline so that an escapement can direct pigs into the pipeline. Pigs are loaded into the barrel which usually has an internal diameter greater than the diameter of the pipeline and the pigs. The pigs move by gravity from the barrel into the pipeline. To control the movement of the pigs into the pipeline, escapement arrangements are employed. The most common is illustrated in Osborne U.S. Pat. No. 2,955,157 wherein two reciprocated pistons control the innermost two pigs in a barrel. To launch a pig, the lowermost pig is released by retracting the forward piston. The rear piston prevents the second pig from being launched at that time. Thereafter, the position of the two pistons is reversed so that a new pig is placed into the lower, launch position. Valves isolate the barrel from the pipeline when a new supply of pigs is loaded into the barrel. These prior launchers were generally not used as pig receivers to remove the pig from the pipeline at some remote location. Thus, special barrel receivers were needed. To provide reversibility for the launcher, so that it could be used as a receiver, a mechanical device as shown in Walker 3,232,090 was suggested. This device is complicated and requires manual actuation for launching pigs. In addition, complicated structure had to be mounted onto the barrels themselves. Because of this complexity, the use of a barrel construction that could be employed both as a launcher and as a receiver for pigs has not been generally available in the field. Consequently, pipelines still employ unidirectional devices, one for launching pigs and the other for receiving pigs. This requires an increased number of barrels and also separate structural arrangements for various pig manipulation devices.

THE INVENTION

The present invention relates to an improved pig launcher which can be used as a pig receiver without having the complexity previously experienced when efforts were made to construct a bi-directional launching and receiving unit.

In accordance with the present invention, there is provided an improvement in a device adapted to be connected to a pipeline for launching generally spherical pigs or spheroids, which device includes an elongated barrel secured to the pipeline and an escapement means for allowing passage of a pig from the barrel to the pipeline. The improvement, in accordance with the invention, is the provision of an elongated pig receptacle or tray having a front end and adapted to be telescopically moved into the barrel to an inserted position with the front end of the receptacle or tray at the forward end of the barrel and wherein the escapement means includes a first member carried by the receptacle and movable between an inwardly extended pig blocking position and a retracting pig passing position, a second member fixed onto the barrel and movable selectively between a first pig blocking position and a second pig passage position and an interconnecting means for drivingly connecting the first and second members when the receptacle or tray is in the inserted position within the barrel.

By employing the present invention, a receptacle or tray for receiving a supply of pigs carries part of the escapement mechanism used to launch pigs into a pipeline. By inserting this receptacle or tray into the barrel, the escapement mechanism is completed and a supply of pigs is provided within the barrel. After all the pigs have been launched, the empty receptacle or tray can be removed and replaced by a loaded receptacle. The loading can be done by using the same receptacle at a receiving barrel. By employing the present invention, a single receptacle can be used to transport pigs from receivers to launchers. In addition, the mechanism of the present invention is bi-directional so that it can be used for receiving pigs as well as for launching pigs. The various features of the present invention allow easy management of pigs to be employed for various functions in pipelines. The receptacle for the pigs may be a basket which carries a portion of the escapement mechanism employed for launching pigs.

The primary object of the present invention is the provision of an improved arrangement for launching and receiving generally spherical pigs or similar objects to be conveyed through pipelines for various purposes.

Another object of the present invention is the provision of an improvement in a launcher for pipeline pigs, which improvement allows the pigs to be transported from a receiving barrel to a launching barrel without losing control of the pigs.

Still a further object of the present invention is the provision of an improvement, as defined above, which improvement employs a receptacle or tray for a plurality of pigs.

Still a further object of the present invention is the provision of an arrangement, as defined above, which receptacle also employs a portion of the escapement arrangement for launching and/or receiving pigs to be passed through a pipeline for a variety of purposes.

These and other objects and advantages will become apparent from the following description taken together with the accompanying drawings described in the next section.

PREFERRED EMBODIMENT

Figure 1:
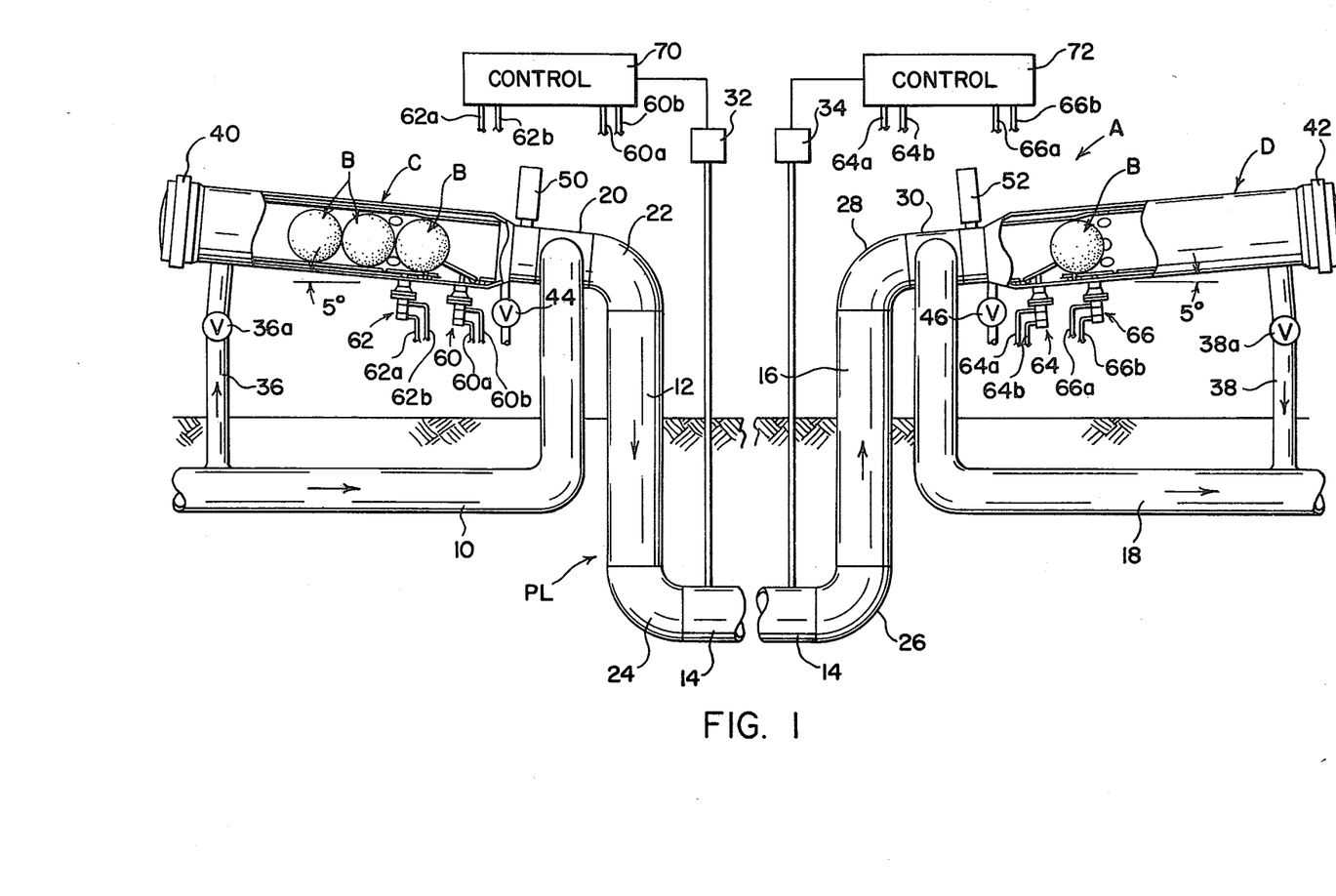
FIG. 1 is a plan view of a system using the preferred embodiment of the present invention showing cut away units used both for launching and receiving pipeline pigs.
Figure 2:
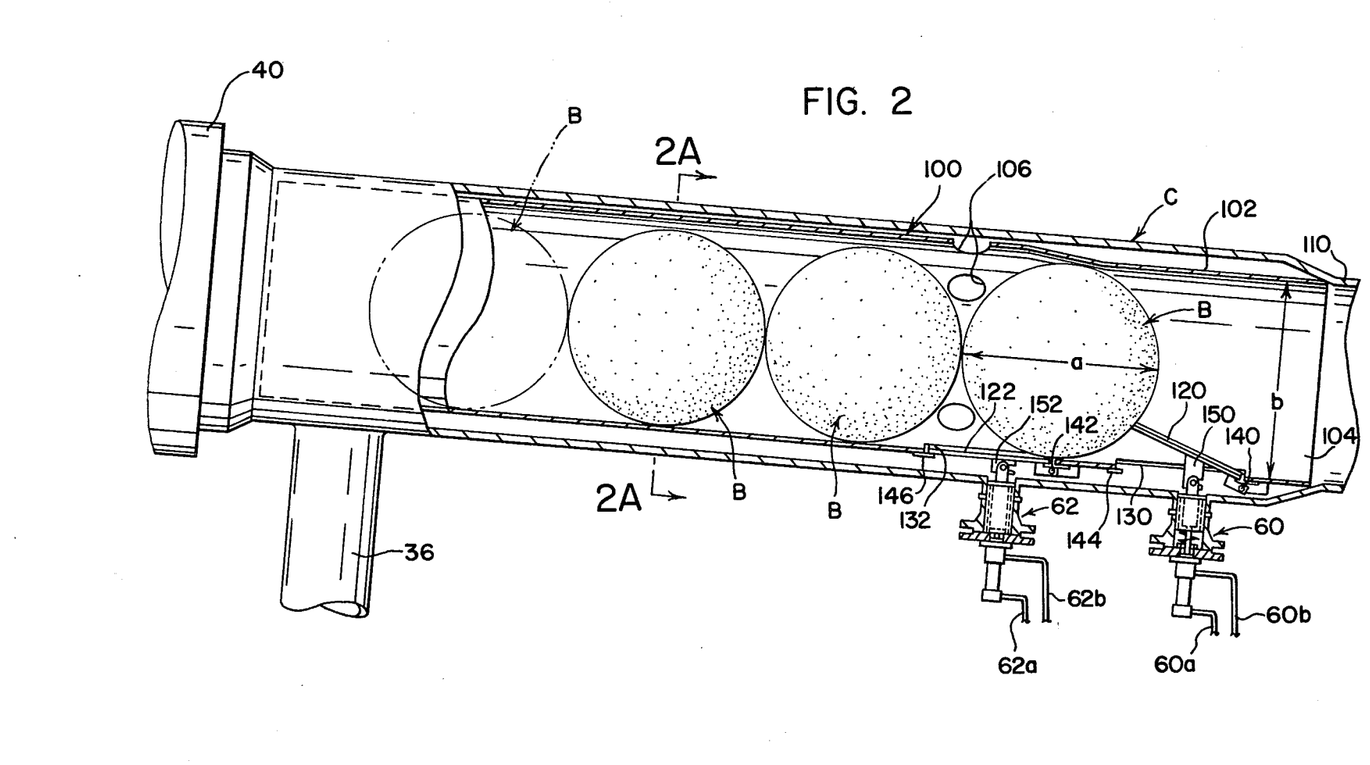
FIG. 2 is an enlarged view of the launching barrel illustrated in FIG. 1.
Figure 2A:
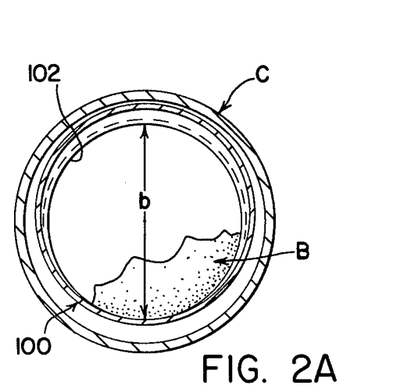
FIG. 2A is a cross-sectional view taken generally along line 2A—2A of FIG. 2.

Referring now to the drawings, wherein the showings are for the purpose of illustrating a preferred embodiment of the invention only, and not for the purpose of limiting same, FIG. 1 shows a pipeline system A including an arrangement for launching generally spherical pigs B having a nominal diameter a, as shown in FIG. 2, from a launching barrel C and for receiving the same pigs at a receiving barrel D. These barrels are secured to pipeline PL at spaced locations. Pipeline PL is illustrated as having branches 10, 12, 14, 16 and 18 connected by appropriate junctions 20–30. In practice, fluid flows through branches 10, 12, 14, 16 and 18 in succession. Branches 10 and 18 have a smaller diameter than branches 12, 14 and 16 so that spherical pigs B pass only through branches 12, 14 and 16 in their travel from launching barrel C to receiving barrel D. These pigs can perform various functions such as cleaning the pipeline section between barrels C, D, measuring parameters in the pipeline, or defining the interface between dissimilar substances conveyed through pipeline PL. In accordance with the illustrated embodiment, pig or spheroid detectors 32, 34 are used to indicate the introduction of a pig into branch 14 and its exit from this branch. Bypass lines 36, 38 are provided with selectively operated valves 36a, 38a to control selectively the amount of fluid flow through lines 36, 38 and, thus, through barrels C, D from left to right, as shown in FIG. 1. End closures 40, 42, of standard design, can be removed from barrels C, D respectively, to load pigs B into launching barrel C and to remove pigs B from receiving barrel D. Appropriately positioned drains 44, 46, generally located at the lower portion of barrels C, D are provided to drain liquid from the barrels after they have been closed off by appropriate valves, illustrated as cutoff valves 50, 52, respectively. By closing these valves and opening drains 44, 46 either one of the inclined barrels C, D can be drained sufficient to remove or insert a plurality of spheroids or pigs. Flow through pipeline PL is indicated by the arrows of FIG. 1 and moves generally from left to right. Of course, the flow could be reversed and be from right to left, in which instance barrel D would be the launcher and barrel C would be the receiver. Consequently, system A is bi-directional with respect to flow and also with respect to the function of the individual barrels C, D, each of which can be used equally well as a launcher or as a receiver. Barrels C, D have a very slight incline with respect to the horizontal. In practice, this is approximately 5°, as shown in FIG. 1. This reduced inclination is possible because the barrels C, D are subjected to pipeline flow through bypass lines 36, 38 when launching or receiving a pig.

In practice, a single pig, or spheroid B can be launched from barrel C and passed through pipeline PL to barrel D. Whenever the pigs separate different liquids flowing through the pipeline, pigs B are launched in succession in the interface between the two liquids for the purposes of equalizing and controlling the interface. Thus, barrels C, D are equally applicable for launching a single pig or a succession of pigs according to the desired function of the pigs passing through the pipeline. Pig launching is performed by an escapement arrangement on the barrel used as a launcher. In FIG. 1, the launcher is barrel C wherein the escapement is operated by successively energizing fluid actuators 60, 62. These same actuators are employed with a different operating function as actuators 64, 66 on barrel D when it is used as a receiver. These four fluid actuators have hydraulic control lines 60a, 60b; 62a; 62b; 64a, 64b; and 66a, 66b which are monitored and controlled by appropriate hydraulic control units, schematically illustrated as control units 70, 72. These units are constructed in accordance with standard practice to operate the launching function. As will be apparent, actuators 64, 66 are not operated in the pig receiving mode. In addition, bypass 36 is operated selectively for launching while bypass 38 is opened continuously for receiving pigs. In view of this, control units 70, 72 are generally used only when connected to actuators of a launching barrel. The controls 70, 72 may be connected to detectors 32, 34; valves 36a, 38a; and, the valves controlling drains 44, 46. The functions of all elements can be monitored and controlled by appropriate devices, schematically illustrated as control units 70, 72. The various operating sequences will be discussed in connection with further description of the preferred embodiment of the invention.

Figure 3:
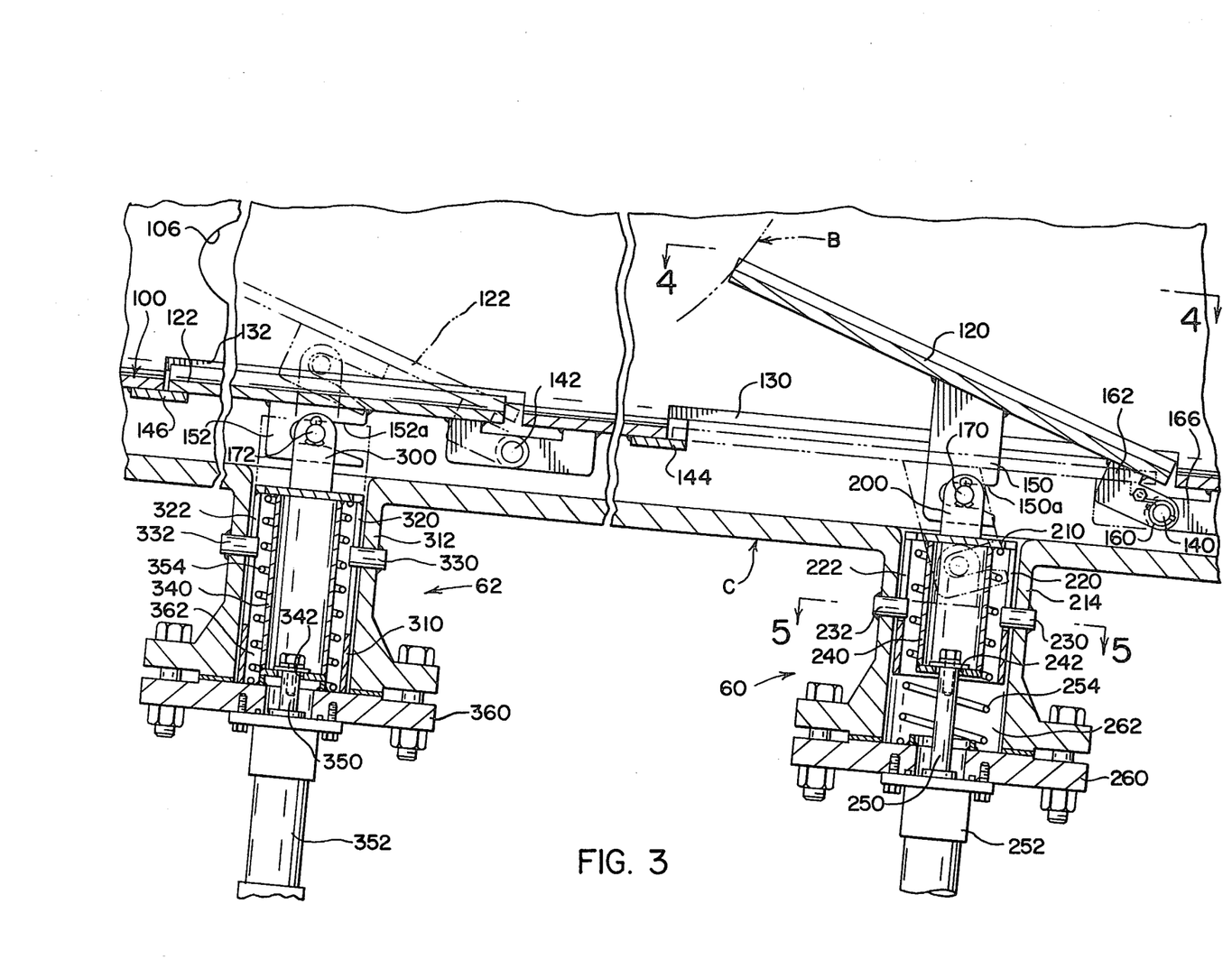
FIG. 3 is an enlarged cross-sectional view showing the position of various members used in the preferred embodiment when a receptacle is inserted into a barrel.
Figure 4:
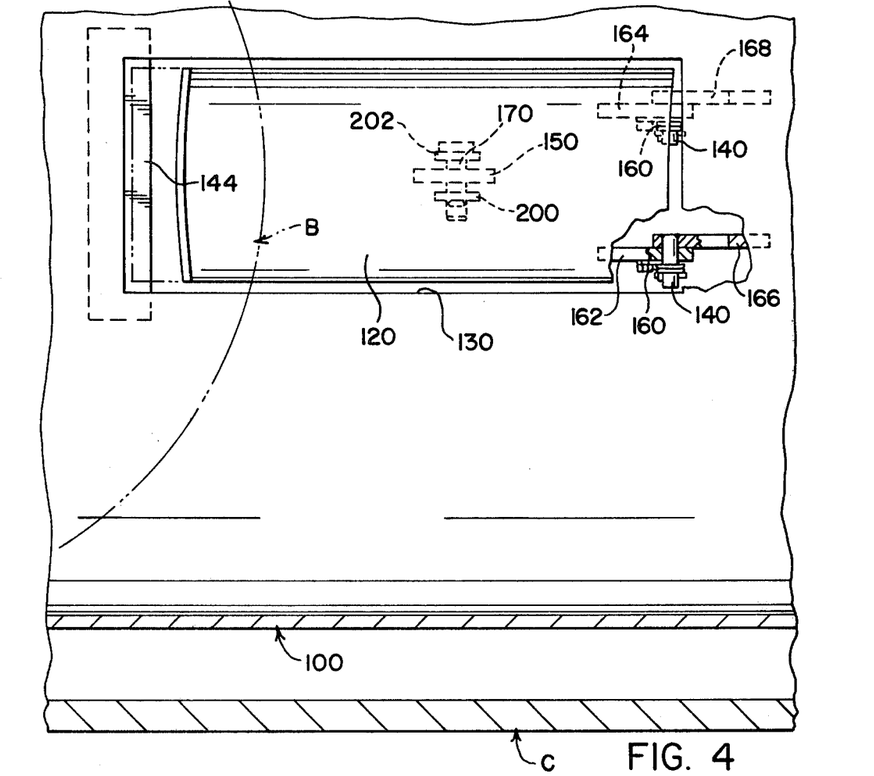
FIG. 4 is a view taken generally along line 4—4 of FIG. 3.

Referring now more particularly to FIGS. 2–5, an elongated, sheet metal basket 100, is illustrated as including a necked down portion or nose 102 having a diameter b which is just slightly larger than a diameter a of pigs B. An opened end 104 of basket 100 is in close relationship with forward end 110 of barrel C when basket 100 is inserted into the barrel, as shown in FIG. 2. Apertures 106 extend circumferentially around basket 100 in its enlarged rear portion just behind front pig B, as shown in FIG. 2. This front pig is ready for launching. These apertures provide communication for the fluid flow through bypass 36 and barrel C toward the pipeline at a location between the front pig in the launching position and the next adjacent pig. In this manner, fluid flow through apertures 106 and nose 102 can be adjusted by valve 36a. This flow provides an impetus or force to drive the front pig to the right, as shown in FIG. 2. The lower portion of basket 100 between opened end 104 and apertures 106 is provided with axially spaced segments or escapement plates 120, 122 having a generally cylindrical contour matching the lower portion of basket 100. As shown in FIG. 2, plate 120 is nearer the forward end of basket 100, while plate 122 is spaced from plate 120 toward the rear of the basket. The spacing between these two plates is such that plate 120 holds the front pig in the launch position, shown in FIG. 2, while the rear plate 122 can hold the next pig, in a manner to be described later, during a pig launch. Plates 120, 122 are located in opening 130, 132, respectively, in basket 100 and are pivotally secured to the basket by pins 140, 142, respectively. Stops, strips or abutments 144, 146 are secured onto the outer surface of basket 100 so that plates 120, 122 can lie flat and generally assume the normal contour of basket 100 when they are pivoted downwardly into engagement with stops 144, 146, respectively. Plate 120 includes a depending hook 150 having a forward opening slot 150a. A shorter hook 152 is secured to and depends from the lower surface of plate 122. This hook has a forward opening slot 152a. To assume the basket insertion position, as shown in FIGS. 2 and 3, plate 120 is pivoted upwardly about pins 140 by the action of two torsion springs 160 biasing plate 120 into the inward or pig blocking position. Arms 162, 164 are joined to arms 166, 168 by pivot pins 140 as previously described. Similar arrangements are used for pivotally mounting both plates 120 and 122. By the action of springs 160, plate 120 is normally in an up position. Plate 122 is normally in a down position. In these positions, as shown in FIGS. 2 and 3, slots 150a, 152a are generally aligned so that basket 100 can be inserted into barrel C after end closure 40 has been removed. Before insertion into barrel C, pigs B are loaded into the basket, as shown in FIG. 2. During this loading action, plate 120 is biased downwardly against the action of springs 160. As soon as a pig passes over plate 120, the plate is pivoted upwardly to prevent inadvertent removal of a loaded pig. After the desired number of pigs has been loaded and plate 120 is back in its pig blocking position, basket 100 can be inserted into barrel C for the purpose of providing pigs to be launched in accordance with the invention. As so far described, plates 120, 122 cannot be actuated and plate 120 is being used to hold the loaded pigs in place in basket 100.

When basket 100 is inserted in either barrel C or barrel D, the forwardly facing hooks 150, 152 are engaged by actuators 60, 62 which then assume the manipulation of these plates to launch pigs. When the invention is used to receive pigs the plates are in their normal position. These operations will be described later.

Figure 5:
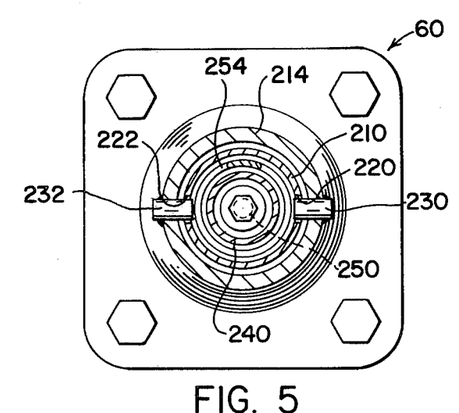
FIG. 5 is a cross-sectional view taken generally along line 5—5 of FIG. 3.

Referring to FIGS. 3 and 5, fluid actuator 60, which engages elongated hook 150 and operates plate 120, includes upwardly extending spaced trunnion legs 200, 202 between which pin 170 is mounted for engagement with slot 150a as basket 100 loaded with pigs is inserted into barrel C. Legs 200, 202 are supported on cup 210 reciprocally mounted in hub 214 formed integrally with barrel C and at the lower portion thereof. Cup 210 includes diametrically spaced, axially extending slots 220, 222 which receive diametrically spaced pins 230, 232, respectively. These pins prevent rotation of cup 210 and also limit its upward position, as shown in FIG. 3. An inner cylinder 240 is welded inside cup 210 and has a lower extending opening 242 through which piston 250 extends. This piston is driven by hydraulic cylinder 252 for pulling cylinder 240 downwardly against an upwardly biasing spring action created by spring 254. Cylinder 252 is supported on cap 260 and closes cavity 262 to prevent leakage of fluid passing through pipeline PL. After basket 100 is in the inserted position, shown in FIG. 2, hook 150 is engaged by pin 170 so that plate 120 can be pivoted around pins 140. To do this, cylinder 252 retracts piston 250. This pulls cylinder 240 downwardly to pull plate 120 downwardly. When piston 250 is released, spring 254 moves plate 120 into the inward, pig blocking position, shown in FIG. 3, which is controlled by the interaction of pins 230, 232 and slots 220, 222, respectively. Thus, by actuation of cylinder 252 the pivoted position of plate 120 can be selectively controlled.

In a similar manner, fluid actuator 62 controls the position of escapement plate 122. The normal position of plate 122 is the down or pig passage position. This is the position of plate 122 during insertion of basket 100 into barrel C. Hook 152 engages pin 172 to control the angular position of plate 122 between an inward pig blocking position and a normal pig passage position. Trunnion legs 300, 302 (the latter of which is not shown) supports pin 172 in the position shown in FIG. 2 so that it will be in alignment with slot 152a during insertion of basket 100. Trunnion legs 300, 302 are supported on cup 310 reciprocally mounted in hub 312. Slots 320, 322 coact with pins 330, 332 to limit the upwardmost movement of cup 310. Inner cylinder 340 has an opening 342 which coacts with the end of piston 350 to control the angular position of plate 122 by fluid actuation through cylinder 352. A spring 354 biases cup 310 into the up position. As previously mentioned, plate 122 is normally in the down or pig passage position. Thus, operation of actuator 62 involves selective extension of piston 350. When this is extended, cup 310 moves upwardly a distance determined by slots 320, 322, as shown in phantom lines in FIG. 3.

Selective operation of fluid actuators 60, 62 controls the sequencing and position of pivotally mounted plates 120, 122 supported on and carried by basket 100.

Figure 6A:
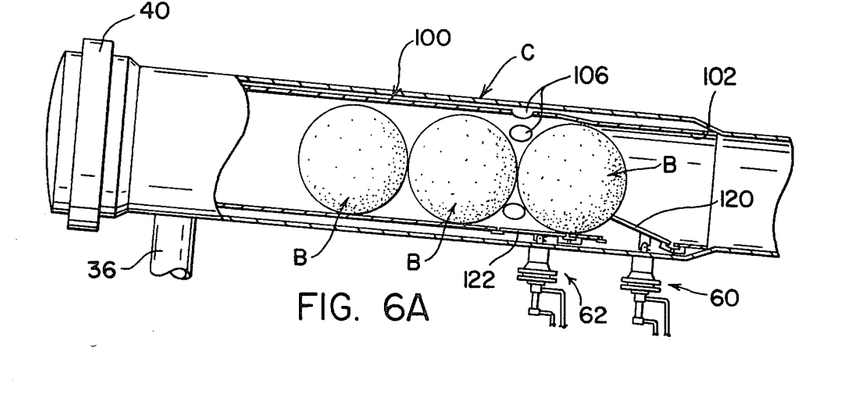
FIGS. 6A–6C are partially cross-sectioned views similar to FIG. 2 showing the sequencing of the escapement mechanism in the preferred embodiment of the present invention for launching a succession of pigs into a pipeline; and, FIGS. 7A–7C illustrate the present invention as used for receiving pigs after they have passed through a pipeline.
Figure 6B:
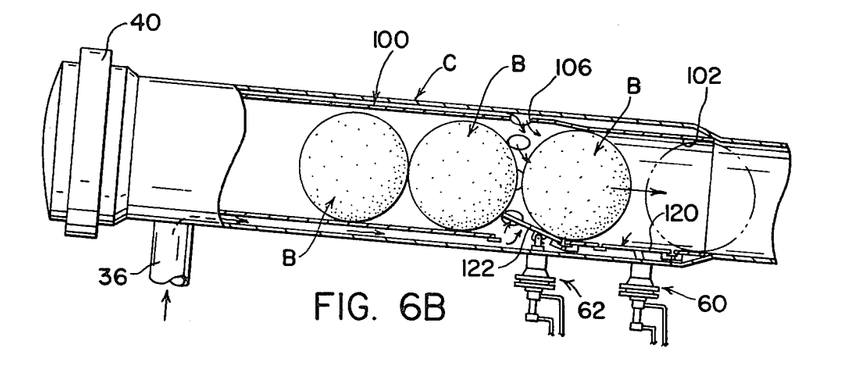
Figure 6C:
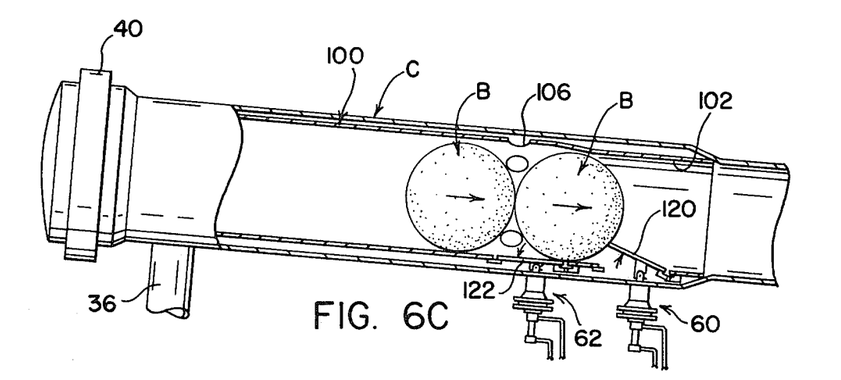

As previously mentioned, the present invention may be used for launching or receiving pigs B. The launching sequencing is illustrated in FIGS. 6A–6C. When a loaded basket 100 is inserted into barrel C, end closure 40 is secured in place. Plate 120 is in the normal up position and plate 122 is in the normal down position. This is all shown in FIG. 6A. Thereafter, a pig may be launched. To do this, actuator 60 pulls plate 120 downwardly and plate 122 is moved upwardly by fluid actuator 62. Flow through bypass line 36 enters the recess between basket 100 and barrel C and moves into the basket through the circumferentially extending group of apertures 106. This places a fluid induced force against the front pig. Since plate 120 is moved downwardly, the front pig is forced or launched by fluid pressure through nose 102 of basket 100 into pipeline where the pig is conveyed by the fluid through segments toward receiving barrel D. This is illustrated in FIG. 6B. When a pig has been launched, plates 120, 122 are forceably reversed by actuator 60, 62 into their normal positions. This allows the next pig B to move forward against plate 120 which is now in the pig blocking position. Plate 122 is in the pig passage, or down position. Fluid flow through bypass 36 is stopped. This is illustrated in FIG. 6C where the next pig is ready to be launched. Alternating between the condition in FIG. 6B and the condition in FIG. 6C sequentially launches pigs into pipeline PL.

Figure 7A:
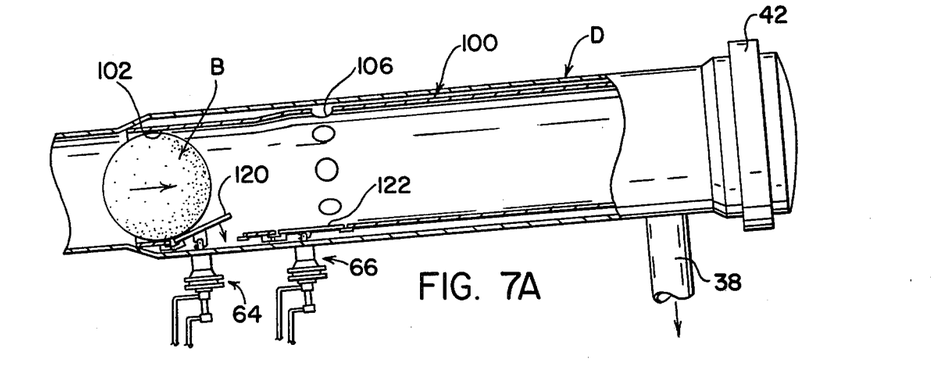
Figure 7B:
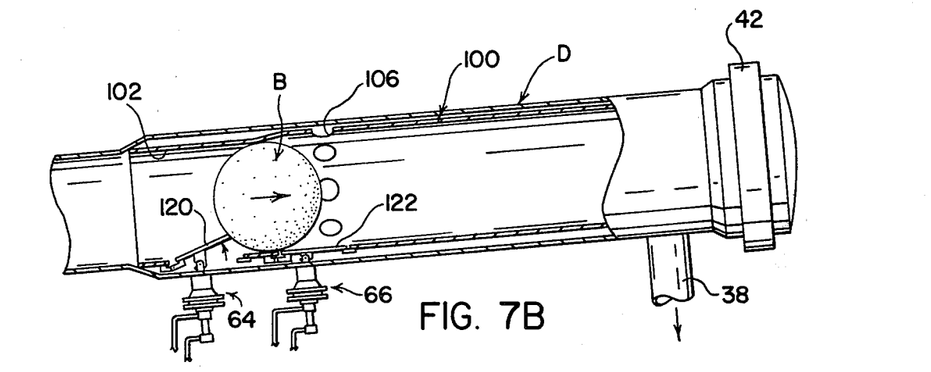
Figure 7C:
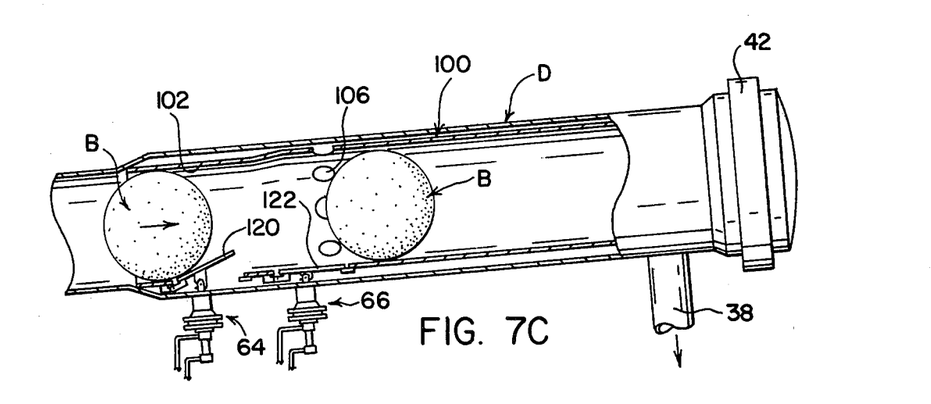

Referring now to FIGS. 7A–7C, the invention when employed in a receiving barrel, such as barrel D, is illustrated. An empty basket 100 is inserted into barrel D and end closure 42 is secured in place. As shown in FIG. 7A, forward plate 120 is in its normal up or pig blocking position and plate 122 is in its normal down or pig passage position. Actuators 64, 66 are not energized for receiving pigs. As a pig approaches and passes into the nose portion of basket 100, it engages upwardly biased plate 120. Fluid flow is caused through barrel D by bypass 38. Pig B engages plate 120 and continues to move into barrel D. As shown in FIG. 3, this will cause plate 120 to pivot downwardly against the biasing action of springs 160 and 254. Thus, pig B can enter basket 100 without operation of actuators 64, 66. After pig B has passed plate 120, the plate pivots back into the pig blocking position as shown in FIG. 7B. This operation continues with the next pig camming plate 120 downwardly as it enters basket 100. This continues until the basket is full. Thereafter, barrel D can be sealed off and the loaded basket can be removed for use in a launching barrel. Of course, barrels C and D could be used either for launching pigs or for receiving pigs. Apertures 106 are generally at the rear portion of pig B after it has passed plate 120. Since flow through bypass 38 causes flow through basket 100 at apertures 106, the first received pig is in the position shown in FIG. 7C. Thereafter, fluid flow into barrel D through apertures 106 continues to force the pigs backwardly until basket 100 is filled. Thereafter, valve 38a can be closed to prevent further pressure on the several pigs captured within basket 100.

Having thus described the invention the following is claimed:

1. In a device adapted to be connected at a given location to a pipeline for launching general spherical pigs into said pipeline, said device including an elongated barrel secured to said pipeline and having a forward end for passage of a pig from said barrel and an escapement means for allowing passage of a pig from said barrel to said pipeline at said given location, the improvement comprising: an elongated pig receptacle having an opened end and adapted to be telescopically moved into said barrel to an inserted position with said opened end at said forward end of said barrel; and, means for releaseably securing said receptacle in said inserted position, and wherein said escapement means including a first member carried by said receptacle and movable between an inwardly extended pig blocking position and a retracted pig passage position, a second member fixed on said barrel and movable selectively between a first pig blocking position and a second pig passage position and interconnecting means for drivingly connecting said first and second members when said receptacle is in said inserted position in said barrel.

2. The improvement as defined in claim 1 wherein said first member is biased into said pig blocking position.

3. The improvement as defined in claim 2 wherein said interconnecting means includes a first element carried by said first member, a second element carried by said second member and said elements having structures which are interlocked as said receptacle is moved into said inserted position with said second member in its first position.

4. The improvement as defined in claim 3 including fluid operated means for selectively moving said second member between its first and second position.

5. The improvement as defined in claim 4 including means for allowing said second member to be forced from said first position to said second position by movement of a pig from said pipeline into said barrel.

6. The improvement as defined in claim 1 wherein said interconnecting means includes a first element carried by said first member, a second element carried by said second member and said elements having structure which are interlocked as said receptacle is moved into said inserted position with said second member in its first position.

7. The improvement as defined in claim 1 including fluid operated means for selectively moving said second member between its first and second positions.

8. The improvement as defined in claim 1 including means for allowing said second member to be forced from said first position to said second position by movement of a pig from said pipeline into said barrel.

9. The improvement as defined in claim 1 wherein said receptacle is generally cylindrical and said first member is formed as a segment of said receptacle and means for pivotally mounting said segment onto said receptacle.

10. The improvement as defined in claim 1 including means for pivotally mounting said first member onto said receptacle.

11. The improvement as defined in claim 1 wherein said interconnecting means includes a trunnion including a pivot pin mounted on one of said members and a hook mounted on the other of said members with said hook and pin interlocking when said receptacle is in said inserted position.

12. The improvement as defined in claim 1 wherein said escapement means includes a pig blocking member carried on said receptacle and spaced inwardly from said first member and operating means on said barrel and engageable with said blocking member when said barrel is in said inserted position for selectively moving said blocking member between a pig blocking position and a pig passage position.

13. The improvement as defined in claim 12 wherein said connecting means includes a first depending element carried by said first member and in a first relative position when said first member is in a pig blocking position, a second depending element carried by said blocking member and in a second relative position when said blocking element is in said pig passage position, said first member having a first receiving element extending into said barrel to said first relative position, said operating means having a second receiving element extending into said barrel to said second relative position whereby said depending elements engage said receiving elements when said receptacle is moved into said inserted position in said barrel.

14. The improvement as defined in claim 12 including means for allowing said pig blocking member and its operating means to be forced into said pig passage position by movement of a pig from said pipeline into said barrel.

15. An elongated pig receptacle having a forward end and adapted to be telescopically moved into a barrel of a pipeline pig launcher, said receptacle comprising: an escapement member, means for supporting said member onto said receptacle at said forward end for movement between a pig blocking position and a pig passage position and an element on said member for automatic connection to an actuator fixed on said barrel as said receptacle is telescopically inserted into said pig launching barrel.

16. An elongated receptacle as defined in claim 15 including means for biasing said escapement member into its pig blocking position.

17. An elongated receptacle as defined in claim 16 including a pig blocking member, means for mounting said blocking member onto said receptacle behind said escapement member for movement between a pig blocking position and a pig passage position and an element on said blocking member for connection to a second actuator fixed on said barrel when said receptacle is inserted into said barrel.

18. In a device adapted to be connected at a given location to a pipeline for launching general spherical pigs into said pipeline, said device including an elongated barrel secured to said pipeline and having a forward end for passage of a pig from said barrel and an escapement means for allowing passage of a pig from said barrel to said pipeline at said given location, the improvement comprising: an elongated pig carrying device having a front end and adapted to be moved into said barrel to an inserted position with said front end at said forward end of said barrel and said escapement means including a first member carried by said carrying device and movable between an inwardly extended pig blocking position and a retracted pig passage position, a second member fixed on said barrel and movable selectively between a first pig blocking position and a second pig passage position and interconnecting means for drivingly connecting said first and second members as said carrying device is moved into said inserted position in said barrel.

19. The improvement as defined in claim 18 wherein said first member is biased into said pig blocking position.

20. The improvement as defined in claim 18 wherein said interconnecting means includes a first element carried by said first member, a second element carried by said second member and said elements having structures which are interlocked as said carrying device is moved into said inserted position with said second member in its first position.

* * * * *